(12) United States Patent
Hu et al.

(10) Patent No.: US 11,888,705 B2
(45) Date of Patent: Jan. 30, 2024

(54) METHOD, DEVICE, AND COMPUTER PROGRAM PRODUCT FOR PROCESSING DATA

(71) Applicant: EMC IP Holding Company LLC, Hopkinton, MA (US)

(72) Inventors: Chenxi Hu, Beijing (CN); Sanping Li, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 543 days.

(21) Appl. No.: 16/883,088

(22) Filed: May 26, 2020

(65) Prior Publication Data

US 2021/0344571 A1 Nov. 4, 2021

(30) Foreign Application Priority Data

Apr. 30, 2020 (CN) .......................... 202010367250.4

(51) Int. Cl.
*H04L 41/16* (2022.01)
*G06N 3/04* (2023.01)
(Continued)

(52) U.S. Cl.
CPC ............... *H04L 41/16* (2013.01); *G06N 3/04* (2013.01); *H04L 45/563* (2013.01); *G06N 3/08* (2013.01)

(58) Field of Classification Search
CPC ............ G06N 3/04; G06N 3/08; G06N 7/005; G06N 7/08; G06N 20/00; G06N 99/005;
(Continued)

(56) References Cited

U.S. PATENT DOCUMENTS 9,563,854 B2 * 2/2017 Cruz Mota ............ G06N 20/00
10,599,957 B2 * 3/2020 Walters ................... G06F 9/541
(Continued)

FOREIGN PATENT DOCUMENTS

CN 102064948 A 5/2011
CN 107210969 A 9/2017
(Continued)

OTHER PUBLICATIONS

Wikipedia, "Artificial Neural Network," https://en.wikipedia.org/wiki/Artificial_neural_network, Feb. 19, 2020, 27 pages.

*Primary Examiner* — Walter J Divito
*Assistant Examiner* — Anthony Luo
(74) *Attorney, Agent, or Firm* — Ryan, Mason & Lewis, LLP

(57) ABSTRACT

Embodiments of the present disclosure relate to a method, a device, and a computer program product for processing data. The method includes: loading, at a switch and in response to receipt of a model loading request from a terminal device, a data processing model specified in the model loading request. The method further includes: acquiring model parameters of the data processing model from the terminal device. The method further includes: processing, in response to receipt of to-be-processed data from the terminal device, the data using the data processing model based on the model parameters. Through the method, data may be processed at a switch, which improves the efficiency of data processing and the utilization rate of computing resources, and reduces the delay of data processing.

20 Claims, 9 Drawing Sheets

(51) Int. Cl.
*H04L 45/00* (2022.01)
*G06N 3/08* (2023.01)

(58) Field of Classification Search
CPC ..... G06F 21/577; H04L 41/16; H04L 41/145; H04L 43/0852; H04L 43/0876; H04L 45/563
See application file for complete search history.

(56) References Cited

U.S. PATENT DOCUMENTS

| | | | |
|---|---|---|---|
| 10,885,441 B2 * | 1/2021 | Zhang | G06N 20/00 |
| 11,205,236 B1 * | 12/2021 | Smith | G06Q 30/0631 |
| 2020/0068472 A1 * | 2/2020 | Kumar | H04W 36/24 |
| 2021/0314996 A1 * | 10/2021 | Liu | H04W 72/23 |

FOREIGN PATENT DOCUMENTS

| | | |
|---|---|---|
| CN | 108243216 A | 7/2018 |
| CN | 108664610 A | 10/2018 |
| CN | 110728351 A | 1/2020 |
| CN | 110874550 A | 3/2020 |

\* cited by examiner

METHOD, DEVICE, AND COMPUTER PROGRAM PRODUCT FOR PROCESSING DATA

RELATED APPLICATION(S)

The present application claims priority to Chinese Patent Application No. 202010367250.4, filed Apr. 30, 2020, and entitled "Method, Device, and Computer Program Product for Processing Data," which is incorporated by reference herein in its entirety.

FIELD

Embodiments of the present disclosure relate to the field of data processing, and more particularly, to a method, a device, and a computer program product for processing data.

BACKGROUND

With the development of computer technologies, the concept of Internet of Things (IoT) has been proposed. IoT is an extended and expanded network on the basis of the Internet, which combines various information sensing devices with the Internet to form a huge network for achieving interconnection of people, machines, and things at any time and any place.

In addition, with the development of big data technologies, a neural network model has been proposed and used. A neural network model is a complex network system formed by a large number of simple processing units that are interconnected widely. Because a neural network model can quickly process a large amount of data, some data in the IoT is also processed using a neural network model at present. However, there are still many problems to be solved in application of a neural network model in the IoT.

SUMMARY

The embodiments of the present disclosure provide a method, a device, and a computer program product for processing data.

According to a first aspect of the present disclosure, a method for processing data is provided. The method includes: loading, at a switch and in response to receipt of a model loading request from a terminal device, a data processing model specified in the model loading request. The method further includes: acquiring model parameters of the data processing model from the terminal device. The method further includes: processing, in response to receipt of to-be-processed data from the terminal device, the data using the data processing model based on the model parameters.

According to a second aspect of the present disclosure, a method for processing data is provided. The method includes: sending, at a terminal device, a model loading request to a switch, a data processing model to be loaded by the switch being specified in the model loading request. The method further includes: sending model parameters of the data processing model to the switch. The method further includes: sending to-be-processed data to the switch, such that the to-be-processed data is processed at the switch based on the data processing model.

According to a third aspect of the present disclosure, a switch is provided. The switch includes: a processor; and a memory storing computer program instructions. The processor runs the computer program instructions in the memory to control an electronic device to perform actions. The actions include: loading, in response to receipt of a model loading request from a terminal device, a data processing model specified in the model loading request; acquiring model parameters of the data processing model from the terminal device; and processing, in response to receipt of to-be-processed data from the terminal device, the data using the data processing model based on the model parameters.

According to a fourth aspect of the present disclosure, a terminal device is provided. The terminal device includes: a processor; and a memory storing computer program instructions. The processor runs the computer program instructions in the memory to control an electronic device to perform actions. The actions include: sending a model loading request to a switch, a data processing model to be loaded by the switch being specified in the model loading request; sending model parameters of the data processing model to the switch; and sending to-be-processed data to the switch, such that the to-be-processed data is processed at the switch based on the data processing model.

According to a fifth aspect of the present disclosure, a computer program product is provided. The computer program product is tangibly stored on a non-volatile computer-readable medium and includes machine-executable instructions that, when executed, cause a machine to perform steps of the method in the first aspect of the present disclosure.

According to a sixth aspect of the present disclosure, a computer program product is provided. The computer program product is tangibly stored on a non-volatile computer-readable medium and includes machine-executable instructions that, when executed, cause a machine to perform steps of the method in the first aspect of the present disclosure.

BRIEF DESCRIPTION OF THE DRAWINGS

The above and other objectives, features, and advantages of the present disclosure will become more apparent by the following detailed description of example embodiments of the present disclosure, presented with reference to the accompanying drawings, and in the example embodiments of the present disclosure, the same reference numerals generally represent the same components.

In each figure, the same or corresponding reference numerals represent the same or corresponding parts.

DETAILED DESCRIPTION

Figure 1:
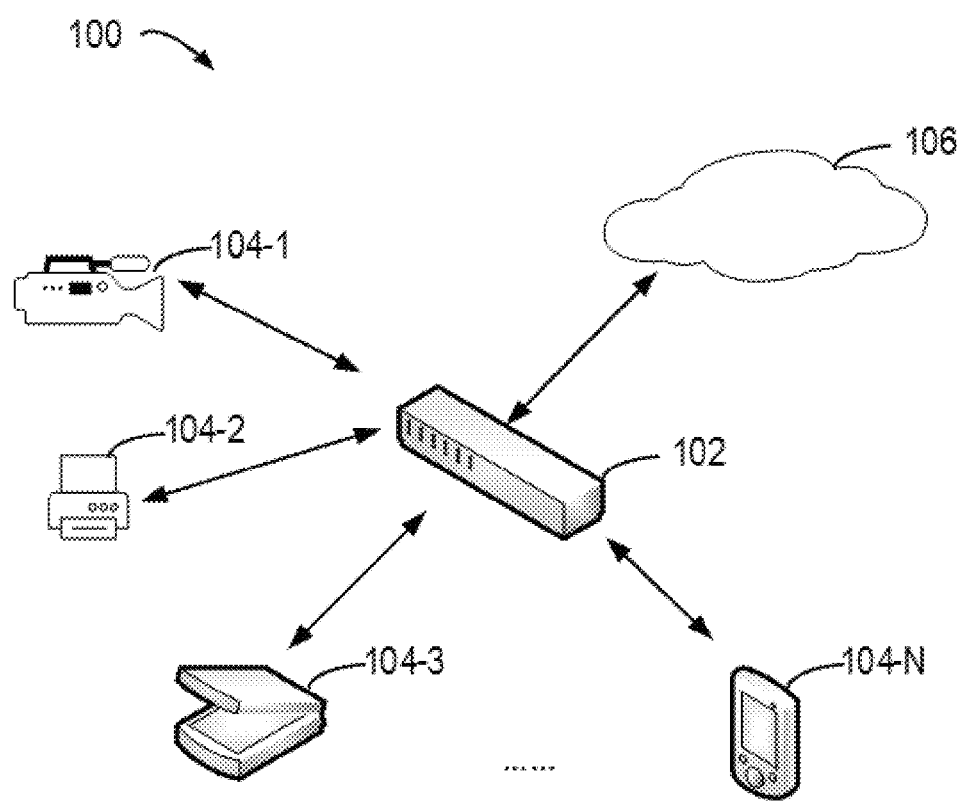
FIG. 1 illustrates a schematic diagram of example environment 100 in which a device and/or a method according to embodiments of the present disclosure may be implemented.

The embodiments of the present disclosure will be described in more detail below with reference to the accompanying drawings. Although some embodiments of the present disclosure are illustrated in the accompanying drawings, it should be understood that the present disclosure may be implemented in various forms and should not be construed as being limited to the embodiments set forth herein. Rather, these embodiments are provided for a more thorough and complete understanding of the present disclosure. It should be understood that the accompanying drawings and embodiments of the present disclosure are for illustrative purposes only, and are not intended to limit the scope of protection of the present disclosure.

In the description of the embodiments of the present disclosure, the term "include" and similar terms should be understood as open inclusion, i.e., "including but not limited to." The term "based on" should be understood as "based at least in part on." The term "one embodiment" or "this embodiment" should be understood as "at least one embodiment." The terms "first," "second," etc. may refer to different or identical objects. Other explicit and implicit definitions may also be included below.

The principles of the present disclosure will be described below with reference to several example embodiments shown in the accompanying drawings. Although preferred embodiments of the present disclosure are illustrated in the accompanying drawings, it should be understood that these embodiments are described only to enable those skilled in the art to better understand and thus implement the present disclosure, and do not limit the scope of the present disclosure in any way.

With the increased use of IoT devices, IoT devices will generate increasingly large amounts of information. Some of the information needs to be processed through a data processing model. For example, data in IoT devices is processed through a neural network model. However, the design of most conventional IoT devices does not support data processing model algorithms, such as a neural network model algorithm. For example, the functions of central processing units (CPUs) of IoT devices are not powerful enough, and there is no graphics processing unit (GPU) or tensor processing unit (TPU). Therefore, IoT devices send data to a data center server for data processing with a neural network model, and the result is returned to IoT devices. However, this process results in a long delay.

In addition, data processing with a data processing model in a server or IoT device will consume CPU, GPU, and memory resources, take up large amounts of computing resources, and reduce the processing efficiency of the server or the IoT device.

In order to solve the above problem, the present disclosure provides a method for processing data. In the method, at a switch and in response to receipt of a model loading request from a terminal device, a data processing model specified in the model loading request is loaded. Then, model parameters of the data processing model are acquired from the terminal device. After receiving to-be-processed data from the terminal device, the data is processed using the data processing model based on the model parameters. Through the method, data may be processed at a switch, which improves the efficiency of data processing and the utilization rate of computing resources, and reduces the delay of data processing.

Hereinafter, FIG. 1 illustrates a schematic diagram of example environment 100 in which a device and/or a method according to embodiments of the present disclosure may be implemented.

As shown in FIG. 1, a switch 102 and multiple different terminal devices 104-1, 104-2, 104-3, . . . , 104-N are included in the example environment, where N is a positive integer. Terminal devices 104-1, 104-2, 104-3, . . . , 104-N are collectively referred to herein as terminal device 104.

Terminal device 104 may be implemented as any type of computing device, including, but not limited to, a mobile phone (for example, smart phone), a laptop computer, a portable digital assistant (PDA), an electronic book (e-book) reader, a portable game machine, a portable media player, a game machine, a set-top box (STB), a smart television (TV), a personal computer, a laptop computer, an on-board computer (for example, navigation unit), a camera, a surveillance camera, a printer, a scanner, a smart door lock, and other various IoT devices.

Terminal device 104 may send data to switch 102. Switch 102 may process data from terminal device 104 or may forward the data to cloud 106, for example, to other servers in cloud 106.

Various data processing models may be run in switch 102 to process various data from terminal device 104. In some embodiments, the data processing model is a machine learning model. Alternatively or additionally, the machine learning model is a neural network model, such as a convolutional neural network model. In some embodiments, the data processing model is any suitable model that may process data. In some embodiments, switch 102 is a programmable switch.

When running the data processing model, switch 102 also needs to receive model parameters and to-be-processed data from terminal device 104. Then, the data is processed using the data processing model based on the received model parameters. A data processing result may be returned to terminal device 104 or transmitted to a destination device based on a destination address transmitted from terminal device 104.

In some embodiments, switch 102 includes a programmable switch. Alternatively or additionally, switch 102 is a switch programmable in P4 language.

Figure 2:
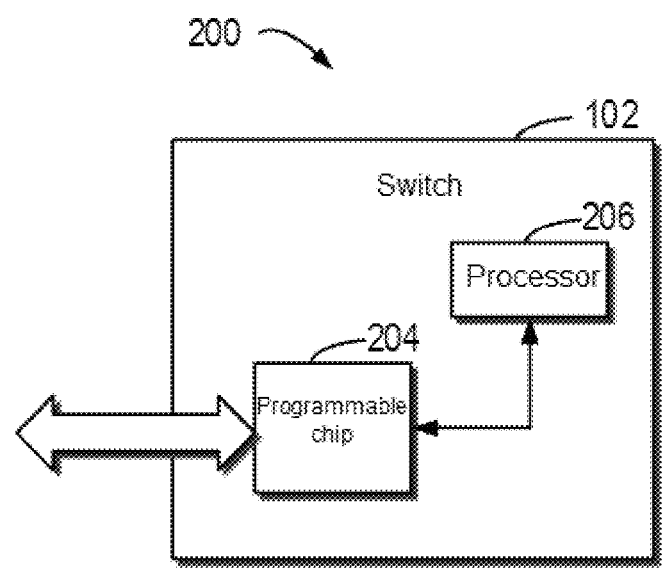
FIG. 2 illustrates a schematic diagram of switch structure 200 according to an embodiment of the present disclosure.

A schematic diagram of environment 100 in which a device and/or a method according to embodiments of the present disclosure may be implemented is described above in conjunction with FIG. 1. An example switch according to an embodiment of the present disclosure is described below in conjunction with FIG. 2. FIG. 2 illustrates a schematic diagram of switch structure 200 according to an embodiment of the present disclosure.

As shown in FIG. 2, switch 102 includes processor 206 and programmable chip 204. Processor 206 is configured to manage the operation of switch 102. Programmable chip 204 may be configured to process data or requests received from terminal device 104. In some embodiments, a data processing model, such as a neural network model, may be loaded on programmable chip 204. Programmable chip 204 may also recognize a packet including model parameters and a packet including to-be-processed data from packets received from terminal device 104. Then, programmable chip 204 processes data using the obtained parameters and the loaded data processing model.

Figure 3:
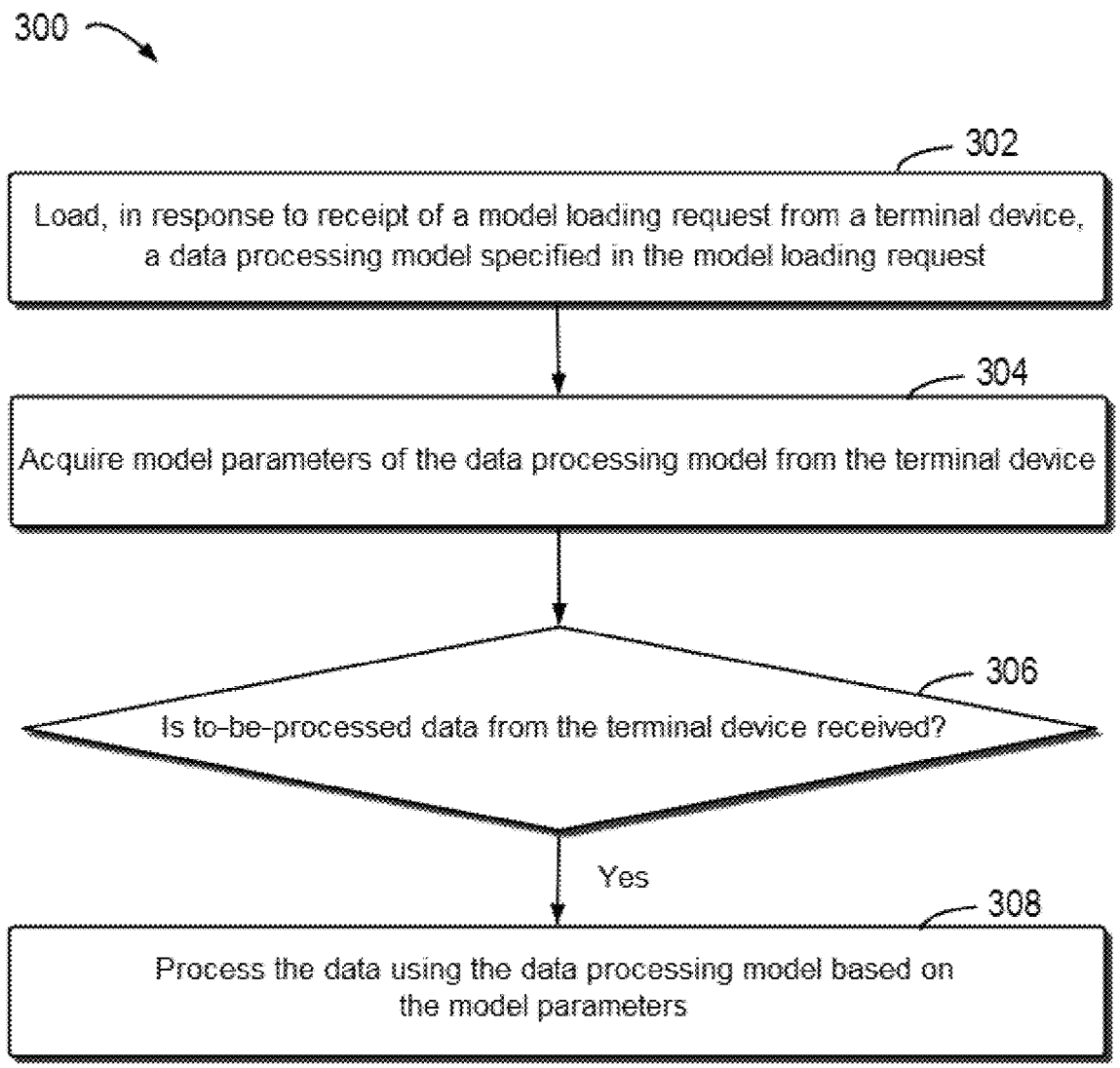
FIG. 3 shows a flowchart of method 300 for processing data according to an embodiment of the present disclosure.

An example of switch 102 according to an embodiment of the present disclosure is described above in conjunction with FIG. 2. A process of processing data at switch 102 is described below in conjunction with FIG. 3. FIG. 3 shows a flowchart of method 300 for processing data according to an embodiment of the present disclosure. Method 300 may be performed at switch 102 in FIG. 1 or at any other suitable device.

At block 302, switch 102 loads, in response to receipt of a model loading request from terminal device 104, a data processing model specified in the model loading request. Switch 102 performs a model loading operation after receiving the loading request.

In some embodiments, the data processing model is a machine learning model. Alternatively or additionally, the machine learning model is a neural network model. In some embodiments, the data processing model is another suitable model for processing data.

In some embodiments, terminal device 104 may first send a request for acquiring a service list to switch 102 to ask what kind of services switch 102 can provide, for example, what kind of data processing models may be executed. Switch 102 then sends a service list to terminal device 104, such as a list of operable data processing models. Terminal device 104 then requests to load a data processing model available in switch 102. In some embodiments, terminal device 104 directly sends a request for loading a data processing model to switch 102. The above examples are only for describing the present disclosure, rather than specifically limiting the present disclosure.

In some embodiments, switch 102 acquires an identifier of a data processing model in the model loading request. Then, switch 102 selects, based on the identifier, a data processing model from a predetermined data processing model set. After obtaining the data processing model, the selected data processing model is loaded.

In some embodiments, switch 102 searches for a locally stored data processing model. If it exists, the data processing model is directly loaded. If it does not exist, a data processing model is acquired from other devices.

In some embodiments, after loading the data processing model, switch 102 will send a response of successful model loading to terminal device 104.

At block 304, switch 102 acquires model parameters of the data processing model from terminal device 104. In order to run the data processing model, it is also necessary to acquire model parameters for running the model from terminal device 104.

In some embodiments, when generating a packet to be sent to switch 102, terminal device 104 will set a content label in the packet to indicate the content of the packet. When receiving the packet, switch 102 will detect the label in the packet. Then, it is determined according to the label whether the packet includes model parameters related to the data processing model. If the label included in the packet indicates that the packet includes model parameters, switch 102 will acquire the model parameters from the packet.

In some embodiments, the data processing model is a neural network model. Switch 102 determines a parameter size corresponding to each processing layer of the neural network model. In one example, since the neural network model is fixed, parameters corresponding to each processing layer of the neural network model may be determined based on the neural network model. In one example, a size of parameters of each processing layer is identified from a parameter packet received from terminal device 104. Switch 102 acquires model parameters corresponding to each processing layer from the packet according to the parameter size.

In some embodiments, after the model parameters have been successfully acquired, switch 102 may send a response to terminal device 104 to indicate that the model parameters have been successfully acquired by switch 102.

At block 306, switch 102 determines whether to-be-processed data from terminal device 104 is received. Upon receiving to-be-processed data from terminal device 104, at block 308, switch 102 processes the data using the data processing model based on the model parameters. A data processing result is obtained after the data is processed by the neural network model.

In some embodiments, switch 102 will detect a label of the received packet. Switch 102 determines whether the packet includes data to be processed by the data processing model through the label of the packet. If the label of the packet indicates that the packet includes data to be processed by the data processing model, switch 102 determines that the to-be-processed data is received.

In some embodiments, the data processing model is a neural network model. Switch 102 transmits the received data to the neural network model as an input. Then, switch 102 processes, based on model parameters corresponding to each processing layer of the neural network model, the data using the neural network model.

In some embodiments, switch 102 will receive a destination address from terminal device 104, for example, a destination address set in the received packet including parameters or including data. Switch 102 sends the data processing result to the destination address. In some embodiments, switch 102 sends a processing result for the data to terminal device 104.

Through the above method, data may be processed at a switch, thereby improving the efficiency of data processing and the utilization rate of computing resources, and reducing the delay of data processing.

Figure 4:
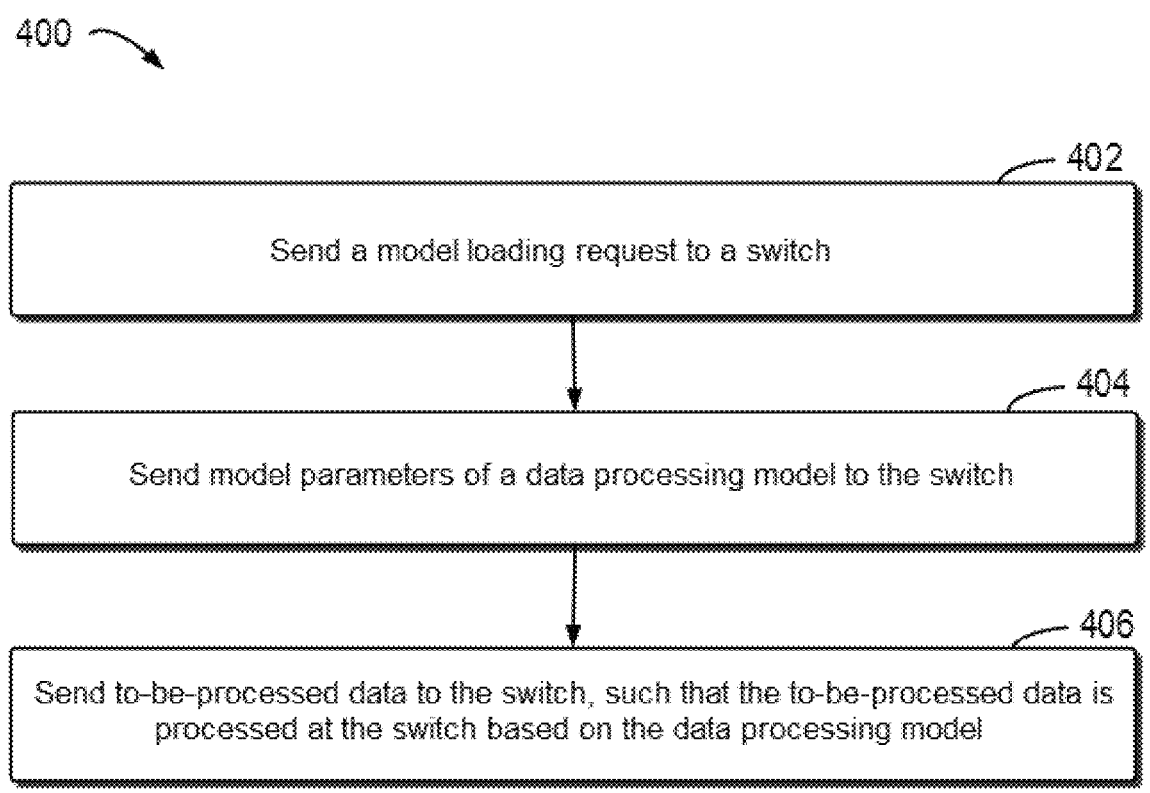
FIG. 4 shows a flowchart of method 400 for processing data according to an embodiment of the present disclosure.

The process for processing data at switch 102 according to an embodiment of the present disclosure is described above in conjunction with FIG. 3. A process of processing data at terminal device 104 is described below in conjunction with FIG. 4. FIG. 4 shows a flowchart of method 400 for processing data according to an embodiment of the present disclosure. Method 400 in FIG. 4 may be performed by terminal device 104 in FIG. 1 or by any other suitable device.

At block 402, terminal device 104 sends a model loading request to switch 102. A data processing model to be loaded by switch 102 is specified in the model loading request. When intending to process data using a data processing model, terminal device 104 may process data in terminal device 104 using the data processing model at switch 102.

In some embodiments, terminal device 104 includes an identifier of the data processing model in the model loading request sent to switch 102. Alternatively or additionally, before sending a model loading request, terminal device 104 will send a request to switch 102 to search for services provided by switch 102, and then receive from switch 102 a list of services switch 102 can provide, for example, a list of data processing models that may be provided.

At block 404, terminal device 104 sends model parameters of the data processing model to switch 102. Since the data processing model loaded in switch 102 is determined, it is necessary to transmit model parameters to the switch.

In some embodiments, terminal device 104 includes the model parameters in a packet to be sent. Then, terminal device 104 sets a content label of the packet as indicating that the packet includes model parameters. Then, terminal device 104 sends the packet to switch 102.

In some embodiments, terminal device 104 will receive from switch 102 a response to the model loading request, and after receiving the response, terminal device 104 sends the model parameters to switch 102.

At block 406, terminal device 104 sends to-be-processed data to switch 102, such that the to-be-processed data is processed at switch 102 based on the data processing model. After sending the model parameters, terminal device 104 also sends to-be-processed data to switch 102 for processing by switch 102.

In some embodiments, terminal device 104 includes data to be processed by the data processing model in a packet to be sent. Then, terminal device 104 sets a content label of the packet as indicating that the packet includes to-be-processed data. After the settings are completed, terminal device 104 sends the packet to switch 102.

In some embodiments, terminal device 104 sends the to-be-processed data to switch 102 after receiving from switch 102 a response indicating that the model parameters are successfully obtained. In some embodiments, terminal device 104 receives a processing result for the data from switch 102.

Figure 5:
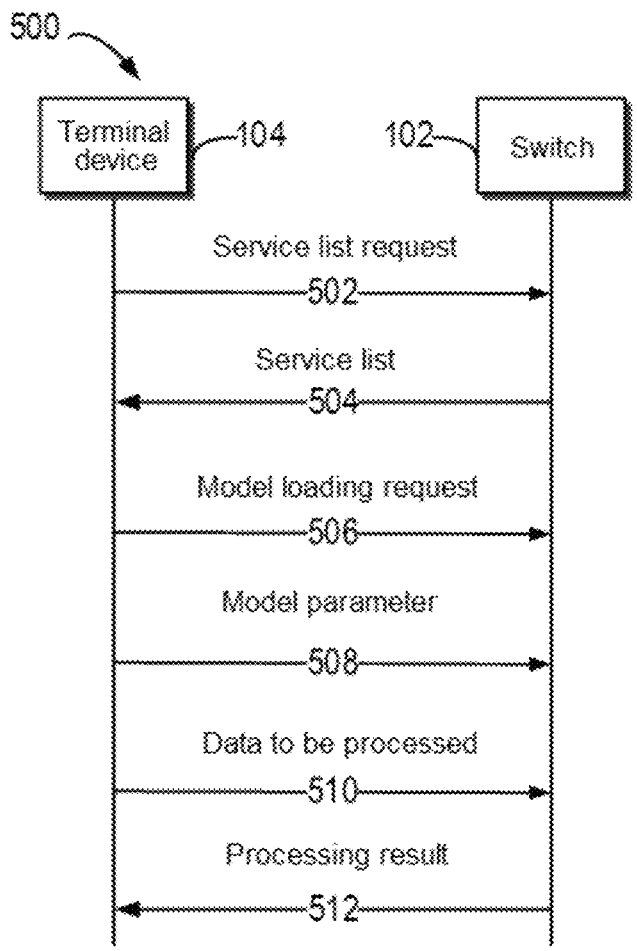
FIG. 5 illustrates a schematic diagram of process 500 of data exchange between a terminal device and a switch according to an embodiment of the present disclosure.

Through the above method, a terminal device may quickly obtain a data processing result, thereby reducing the delay of obtaining a result and improving the computing efficiency. FIG. 4 shows a schematic diagram of method 400 for processing data according to an embodiment of the present disclosure above. An example operation of transferring data between terminal device 104 and switch 102 will be described below in conjunction with FIG. 5. FIG. 5 illustrates a schematic diagram of process 500 of exchanging data between terminal device 104 and switch 102 according to an embodiment of the present disclosure.

In FIG. 5, terminal device 104 first sends 502 a request for acquiring a service list to switch 102. Then, switch 102 sends 504 service list to terminal device 104. For example, the service list may include various neural network models that switch 102 can provide. After receiving the service list and determining an available data processing model, terminal device 104 sends 506 a model loading request to switch 102.

Switch 102 then loads the data processing model based on a data processing model identifier in the model loading request. Alternatively or additionally, after loading the data processing model, switch 102 sends a response of successful model loading to terminal device 104. Terminal device 104 then sends 508 model parameters to switch 102. After receiving the model parameters, the switch acquires the model parameters. When the data processing model is a neural network model, parameters of each processing layer are acquired according to a size of each processing layer of the neural network model.

Optionally, after switch 102 successfully receives the model parameters, switch 102 may send a response of successful parameter acquisition to terminal device 104. Terminal device 104 then sends 510 to-be-processed data.

Then, switch 102 processes data using the data processing model. Then, a processing result is returned 512 to terminal device 104.

By transferring data between a terminal device and a switch to process data on the switch, the delay of data processing is reduced and the efficiency of data processing is improved.

Figure 6:
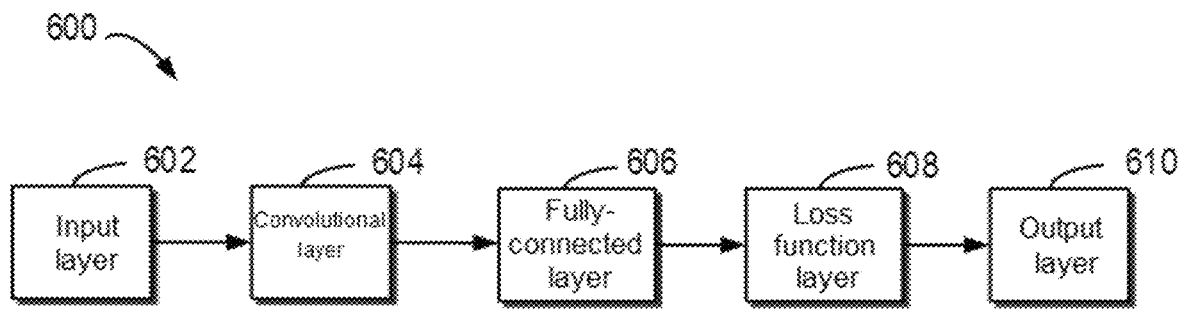
FIG. 6 illustrates a schematic diagram of neural network model 600 according to an embodiment of the present disclosure.
Figure 7A:
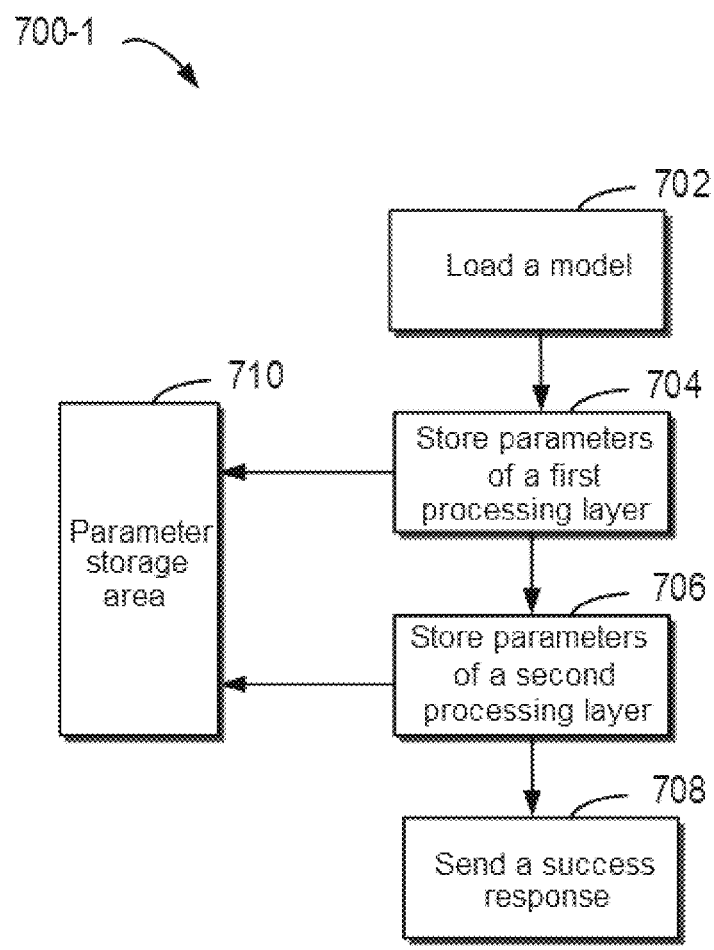
FIG. 7A illustrates a schematic diagram of process 700-1 of loading a data processing model and model parameters according to an embodiment of the present disclosure.
Figure 7B:
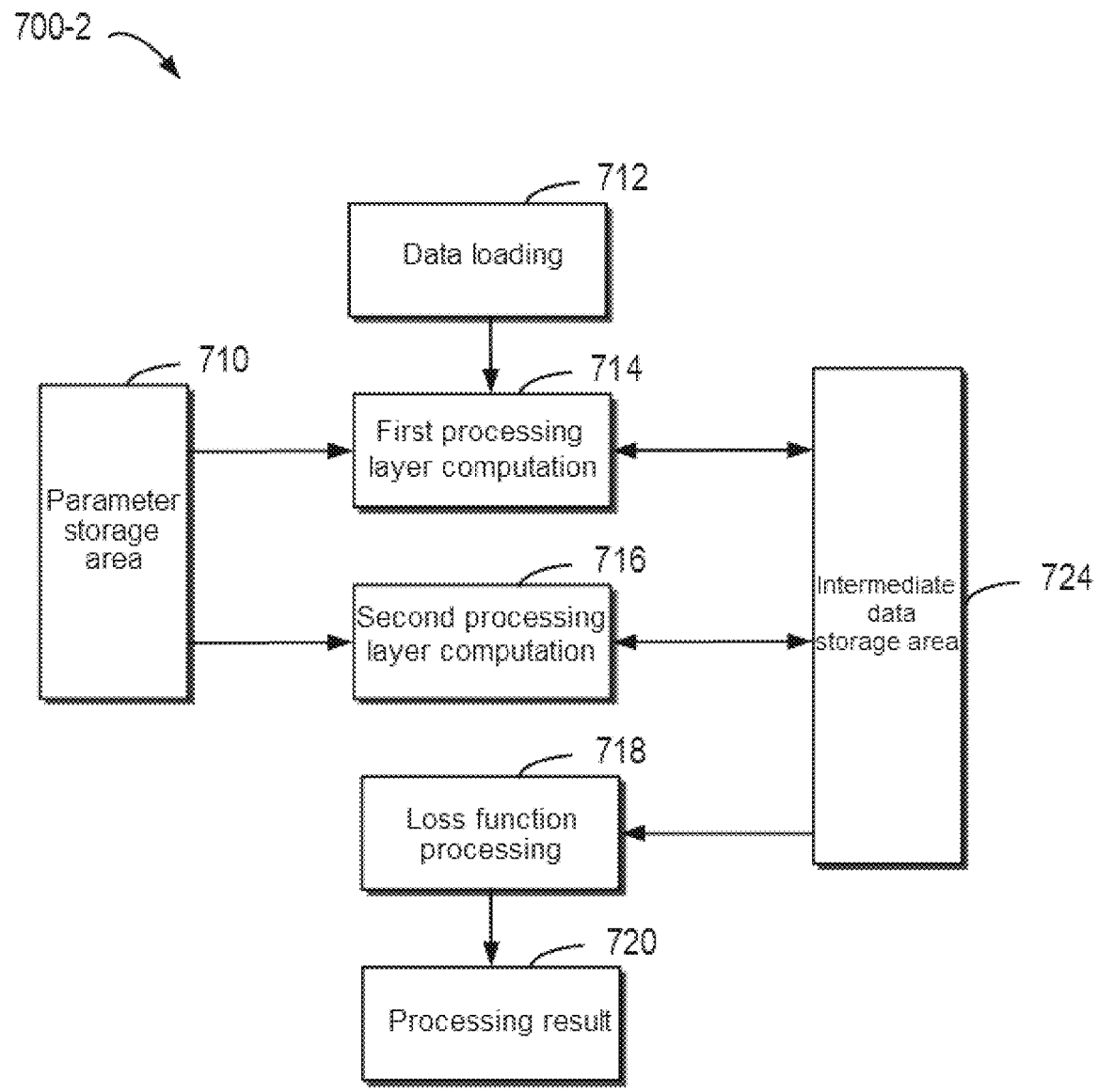
FIG. 7B illustrates a schematic diagram of data processing process 700-2 according to an embodiment of the present disclosure.

FIG. 5 describes a schematic diagram of process 500 of exchanging data between terminal device 104 and switch 102 according to an embodiment of the present disclosure above. Specific examples of the operation of the neural network model will be described below in conjunction with FIGS. 6, 7A, and 7B. FIG. 6 illustrates a schematic diagram of neural network model 600 according to an embodiment of the present disclosure. FIG. 7A illustrates a schematic diagram of process 700-1 of loading a data processing model and model parameters according to an embodiment of the present disclosure. FIG. 7B illustrates a schematic diagram of process 700-2 of processing data according to an embodiment of the present disclosure.

Neural network model 600 shown in FIG. 6 has input layer 602, convolutional layer 604, fully-connected layer 606, loss function layer 608, and output layer 610. Data to be processed is input by input layer 602, a convolutional operation is then performed at convolutional layer 604, and a generated intermediate result is input to fully-connected layer 606. For convenience of description, convolutional layer 604 is called a first processing layer, and fully-connected layer 606 is called a second processing layer. The data computed by fully-connected layer 606 is input to loss function layer 608. For example, the loss function is softmax. The data is then output from output layer 610.

FIG. 7A describes the process of loading a neural network model and model parameters in FIG. 6. Switch 102 preferably performs a model loading operation at block 702. Then, after receiving a data packet, switch 102 stores parameters of the first processing layer at block 704 based on a size of parameters of the first processing layer in neural network model 600. The parameters of the first processing layer are saved in parameter storage area 710. Switch 102 then stores parameters of the second processing layer based on a size of parameters of the second processing layer at block 706. The parameters of the second processing layer are also stored in parameter storage area 710. A success response is sent at block 708.

FIG. 7B describes the data processing process of neural network model 600 in FIG. 6. Switch 102 loads data to be processed at block 712 after receiving a data packet. Switch 102 then acquires, from parameter storage area 710, parameters corresponding to a first processing layer, such as parameters corresponding to convolutional layer 604, and performs first processing layer computation on the received data at block 714. When performing a convolutional operation, convolutional parameters may be used to cyclically process different data sub-portions in the data. Intermediate data obtained after processing by the first processing layer is transmitted to intermediate data storage area 724. Then, second processing layer computation is performed at block 716. At this moment, parameters of a second processing layer, such as parameters of a fully-connected layer, are obtained from parameter storage area 710. A computing result is then put into intermediate data storage area 724. At block 718, intermediate data obtained from the second processing layer computation is subjected to loss function processing, for example, using softmax. Then, processing result 720 is obtained.

Figure 8:
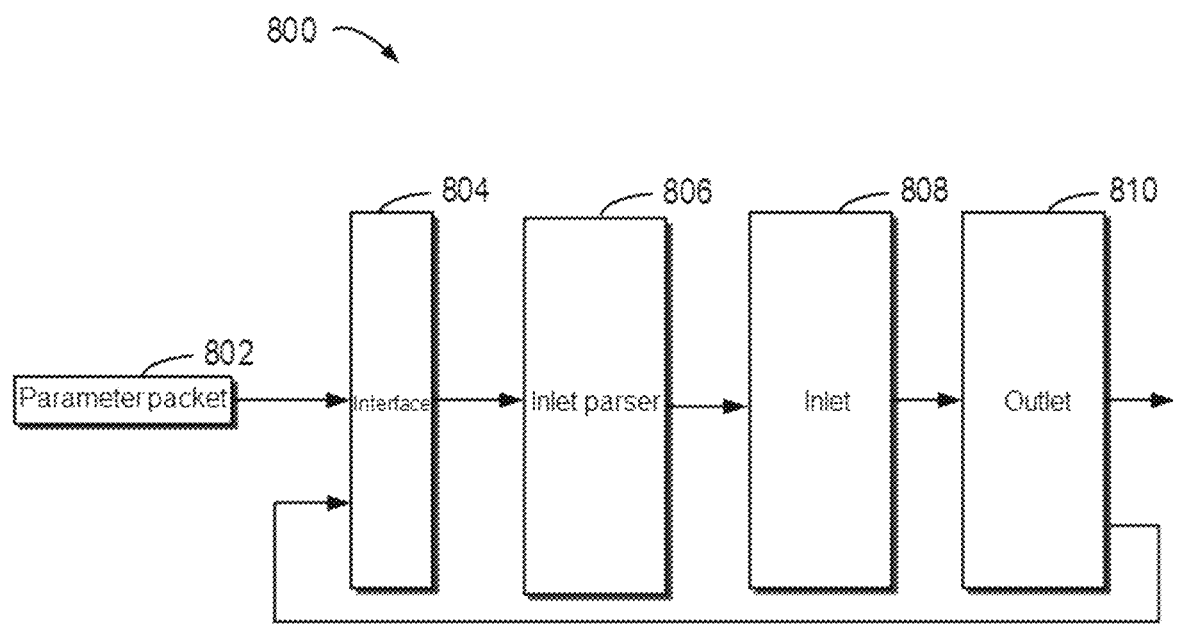
FIG. 8 illustrates a schematic diagram of process 800 for processing a parameter packet according to an embodiment of the present disclosure.
Figure 9:
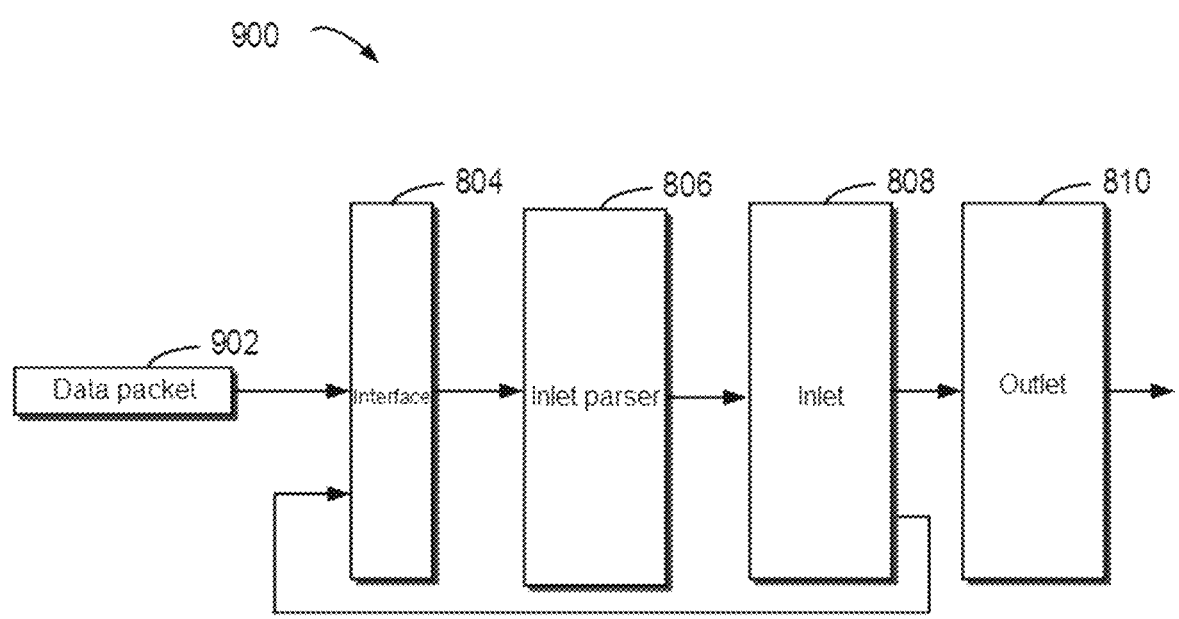
FIG. 9 illustrates a schematic diagram of process 900 for processing a data packet according to an embodiment of the present disclosure.

The processes of loading parameters of neural network model 600 and processing data are described above in conjunction with FIGS. 6, 7A, and 7B. The process of operating in a programmable chip of switch 102 is described below with reference to FIGS. 8 and 9. FIG. 8 illustrates a schematic diagram of process 800 for processing a parameter packet according to an embodiment of the present disclosure. FIG. 9 illustrates a schematic diagram of process 900 for processing a data packet according to an embodiment of the present disclosure.

In FIG. 8, parameter packet 802 is transmitted to interface 804 of a programmable switch chip in switch 102, and then is parsed in inlet parser 806. The parsed data is processed in inlet 808, and parameters of a first processing layer are acquired from parameter packet 802. The remaining data is then transmitted to outlet 810. If the parameter packet further includes unobtained parameters, the parameter packet is transmitted from outlet 810 to interface 804 to further acquire parameters of a second layer or other layers. For example, a recirculate command in a programmable switch may be used to transmit a packet including unobtained parameters from outlet 810 back to interface 804.

In FIG. 9, data packet 902 is transmitted to interface 804 of a programmable switch chip in switch 102, and then is parsed in inlet parser 806. The processed data is processed in inlet 808. For example, a part of the data is processed by convolutional processing, and then the data is transmitted from inlet 808 back to interface 804, so as to acquire other data to be processed for convolutional operations. For example, the above process may be implemented through a resubmit command in the programmable switch. The data transmission process is performed until the operations of all processing layers are completed, and then the data is output to outlet 810 to output a computing result.

Figure 10:
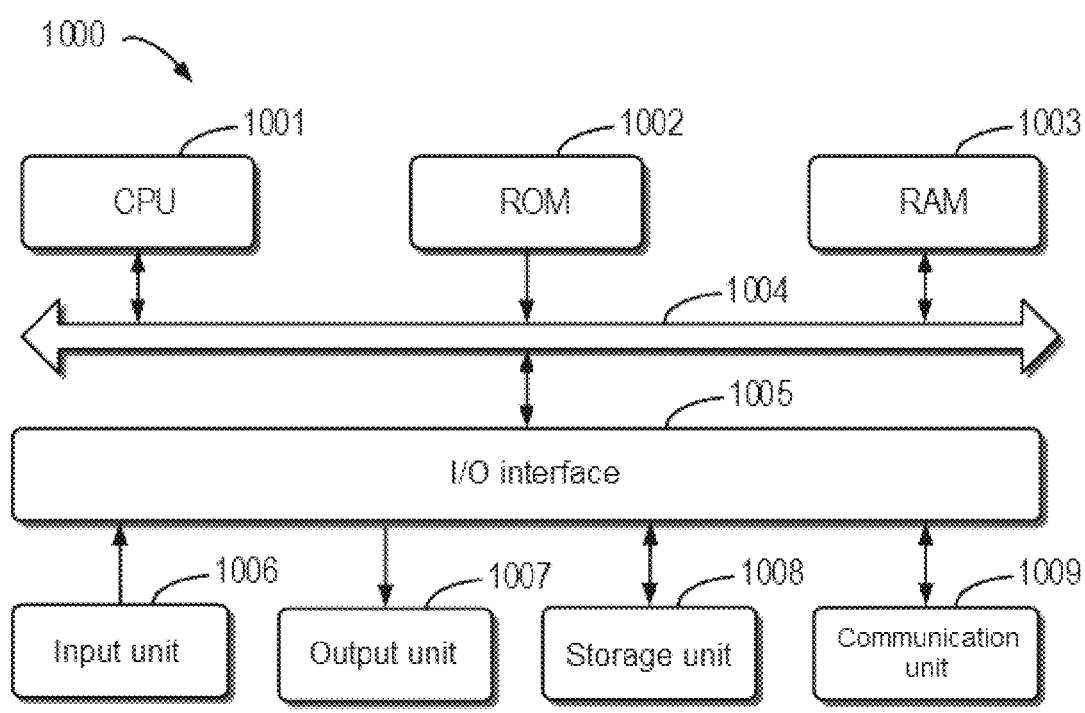
FIG. 10 illustrates a schematic block diagram of example device 1000 that is adapted to implement embodiments of the present disclosure.

FIG. 10 illustrates a schematic block diagram of example device 1000 that may be used to implement embodiments of the present disclosure. For example, switch 102 and terminal device 104 as shown in FIG. 1 may be implemented by device 1000. As shown in the figure, device 1000 includes CPU 1001 that may perform various appropriate actions and processing according to computer program instructions stored in read-only memory (ROM) 1002 or computer program instructions loaded from storage unit 1008 to random access memory (RAM) 1003. In RAM 1003, various programs and data required for the operation of device 1000 may also be stored. CPU 1001, ROM 1002, and RAM 1003 are connected to each other through bus 1004. Input/output (I/O) interface 1005 is also connected to bus 1004.

Multiple components in device 1000 are connected to I/O interface 1005, including: input unit 1006, such as a keyboard or a mouse; output unit 1007, such as various types of displays or speakers; storage unit 1008, such as a magnetic disk or an optical disk; and communication unit 1009, such as a network card, a modem, or a wireless communication transceiver. Communication unit 1009 allows device 1000 to exchange information/data with other devices over a computer network such as the Internet and/or various telecommunication networks.

The various processes and processing described above, such as method 300 and method 400, may be performed by processing unit 1001. For example, in some embodiments, method 300 and method 400 may be implemented as a computer software program that is tangibly included in a machine-readable medium, such as storage unit 1008. In some embodiments, some or all of the computer program may be loaded and/or installed onto device 1000 via ROM 1002 and/or communication unit 1009. One or more actions of method 300 and method 400 described above may be performed when the computer program is loaded into RAM 1003 and executed by CPU 1001.

Embodiments of the present disclosure include a method, an apparatus, a system, and/or a computer program product. The computer program product may include a computer-readable storage medium having computer-readable program instructions for performing various aspects of the present disclosure loaded thereon.

The computer-readable storage medium may be a tangible device that may hold and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, RAM, ROM, an erasable programmable read only memory (EPROM or flash memory), a static random access memory (SRAM), a portable compact disk read only memory (CD-ROM), a digital versatile disk (DVD), a memory stick, a floppy disk, a mechanical coding device such as a punch card or a protruding structure within a groove having instructions stored thereon, and any suitable combination of the foregoing. The computer-readable storage medium as used herein is not to be interpreted as transient signals per se, such as radio waves or other freely propagated electromagnetic waves, electromagnetic waves propagated through waveguides or other transmission media (e.g., light pulses through fiber-optic cables), or electrical signals transmitted through electrical wires.

The computer-readable program instructions described herein may be downloaded from the computer-readable storage medium to various computing/processing devices or downloaded to an external computer or an external storage device over a network, such as the Internet, a local area network (LAN), a wide area network (WAN), and/or a wireless network. The network may include copper transmission cables, fiber optic transmission, wireless transmission, routers, firewalls, switches, gateway computers, and/or edge servers. A network adapter card or network interface in each computing/processing device receives a computer-readable program instruction from the network and forwards the computer-readable program instruction for storage in the computer-readable storage medium in each computing/processing device.

The computer program instructions for performing the operations of the present disclosure may be assembly instructions, instruction set architecture (ISA) instructions, machine instructions, machine-related instructions, microcode, firmware instructions, status setting data, or source code or object code written in any combination of one or more programming languages, including object-oriented programming languages such as Smalltalk, C++, etc., as well as conventional procedural programming languages such as the "C" language or similar programming languages. The computer-readable program instructions can be completely executed on a user's computer, partially executed on a user's computer, executed as a separate software package, partially executed on a user's computer and partially executed on a remote computer, or completely executed on a remote computer or a server. In the case where a remote computer is involved, the remote computer may be connected to a user's computer through any type of networks, including an LAN or a WAN, or may be connected to an external computer, e.g., connected through the Internet by using an Internet service provider. In some embodiments, an electronic circuit, such as a programmable logic circuit, a field programmable gate array (FPGA), or a programmable logic array (PLA), may be customized by utilizing status information of computer-readable program instructions. The electronic circuit may execute the computer-readable program instructions to implement various aspects of the present disclosure.

Various aspects of the present disclosure are described herein with reference to flowcharts and/or block diagrams of the method, apparatus/system, and computer program product according to the embodiments of the present disclosure. It should be understood that each block in the flowcharts and/or the block diagrams and combinations of the blocks in the flowcharts and/or the block diagrams may be implemented by computer-readable program instructions.

The computer-readable program instructions may be provided to a processing unit of a general-purpose computer, a special-purpose computer, or other programmable data processing apparatuses, thereby producing a machine, such that when these instructions are executed by the processing unit of the computer or other programmable data processing apparatuses, an apparatus for implementing functions/actions specified in one or more blocks in the flowcharts and/or the block diagrams is generated. The computer-readable program instructions may also be stored in the computer-readable storage medium. The instructions enable a computer, a programmable data processing apparatus, and/or other devices to operate in a specific manner, so that the computer-readable medium storing the instructions includes an article of manufacture that includes instructions for implementing various aspects of functions/actions specified in one or more blocks in the flowcharts and/or the block diagrams.

The computer-readable program instructions may also be loaded onto a computer, other programmable data processing apparatuses, or other devices, such that a series of operational steps are performed on the computer, other programmable data processing apparatuses, or other devices to produce a computer-implemented process. Thus, the instructions executed on the computer, other programmable data processing apparatuses, or other devices implement the functions/actions specified in one or more blocks in the flowcharts and/or the block diagrams.

The flowcharts and block diagrams in the accompanying drawings illustrate architectures, functions, and operations of possible implementations of systems, methods, and computer program products according to multiple embodiments of the present disclosure. In this regard, each block in the flowcharts or block diagrams can represent a module, a program segment, or a portion of an instruction that includes one or more executable instructions for implementing specified logical functions. In some alternative implementations, functions labeled in the blocks may occur in an order different from that labeled in the accompanying drawings. For example, two successive blocks may actually be performed basically in parallel, or they may be performed in an opposite order sometimes, depending on the functions involved. It should also be noted that each block in the block diagrams and/or flowcharts and a combination of blocks in the block diagrams and/or flowcharts can be implemented using a dedicated hardware-based system for executing specified functions or actions, or can be implemented using a combination of dedicated hardware and computer instructions.

Various embodiments of the present disclosure have been described above. The foregoing description is illustrative rather than exhaustive, and is not limited to the disclosed embodiments. Multiple modifications and variations will be apparent to those skilled in the art without departing from the scope and spirit of the illustrated various embodiments. The selection of terms as used herein is intended to best explain the principles and practical applications of the various embodiments or the technical improvements to technologies on the market, and to otherwise enable persons of ordinary skill in the art to understand the embodiments disclosed herein.

What is claimed is:

1. A method for processing data, comprising:
   loading, at a switch and in response to receipt of a model loading request from a terminal device, a data processing model specified in the model loading request;
   acquiring model parameters of the data processing model from the terminal device; and
   processing, in response to receipt of to-be-processed data from the terminal device, the data using the data processing model based on the model parameters;
   wherein the switch comprises a programmable switch and is implemented in a network separate from the terminal device;
   wherein the programmable switch is programmed to (i) select the data processing model based on the model parameters acquired from the terminal device, and (ii) process the data received from the terminal device using the selected data processing model;
   wherein the terminal device comprises an Internet of Things (IoT) device that provides both the model parameters and the to-be-processed data to the programmable switch, the model parameters and the to-be-processed data being provided by the IoT device to the programmable switch responsive to receipt of a service list in the IoT device from the programmable switch, the service list identifying a plurality of different neural network models that are executable in the programmable switch, the model parameters provided by the IoT device to the programmable switch comprising one or more characteristics of each of one or more network layers of a given one of the neural network models; and
   wherein an output generated by the programmable switch utilizing the selected data processing model is returned to the same IoT device that provided both the model parameters and the to-be-processed data to the programmable switch.

2. The method according to claim 1, wherein loading the data processing model comprises:
   acquiring an identifier of the data processing model in the model loading request;
   selecting, based on the identifier, the data processing model from a predetermined data processing model set; and
   loading the selected data processing model.

3. The method according to claim 1, wherein acquiring the model parameters comprises:
   determining, based on a content label of a packet received from the terminal device, whether the packet comprises model parameters related to the data processing model; and
   acquiring the model parameters from the packet according to a determination that the packet comprises the model parameters.

4. The method according to claim 3, wherein the data processing model is a neural network model, and acquiring the model parameters from the packet comprises:
- determining a parameter size corresponding to each processing layer of the neural network model; and
- acquiring model parameters corresponding to each processing layer from the packet according to the parameter size.

5. The method according to claim 1, further comprising:
- determining, based on a content label of a packet received from the terminal device, whether the packet comprises data to be processed by the data processing model; and
- determining, according to a determination that the packet comprises data to be processed by the data processing model, that the to-be-processed data is received.

6. The method according to claim 1, wherein the data processing model is a neural network model, and processing the data comprises:
- processing, based on model parameters corresponding to each processing layer of the neural network model, the data using the neural network model.

7. The method according to claim 1, further comprising at least one of the following:
- sending, in response to receipt of a destination address from the terminal device, a processing result for the data based on the destination address; and
- sending the processing result for the data to the terminal device.

8. A method for processing data, comprising:
- sending, at a terminal device, a model loading request to a switch, a data processing model to be loaded by the switch being specified in the model loading request;
- sending model parameters of the data processing model to the switch; and
- sending to-be-processed data to the switch, such that the to-be-processed data is processed at the switch based on the data processing model;
- wherein the switch comprises a programmable switch and is implemented in a network separate from the terminal device;
- wherein the programmable switch is programmed to (i) select the data processing model based on the model parameters acquired from the terminal device, and (ii) process the data received from the terminal device using the selected data processing model;
- wherein the terminal device comprises an Internet of Things (IoT) device that provides both the model parameters and the to-be-processed data to the programmable switch, the model parameters and the to-be-processed data being provided by the IoT device to the programmable switch responsive to receipt of a service list in the IoT device from the programmable switch, the service list identifying a plurality of different neural network models that are executable in the programmable switch, the model parameters provided by the IoT device to the programmable switch comprising one or more characteristics of each of one or more network layers of a given one of the neural network models; and
- wherein an output generated by the programmable switch utilizing the selected data processing model is returned to the same IoT device that provided both the model parameters and the to-be-processed data to the programmable switch.

9. The method according to claim 8, further comprising: receiving a processing result for the data from the switch.

10. The method according to claim 8, wherein sending the model parameters to the switch comprises:
- including the model parameters in a packet to be sent;
- setting a content label of the packet as indicating that the packet comprises the model parameters; and
- sending the packet to the switch.

11. The method according to claim 8, wherein sending to-be-processed data to the switch comprises:
- including the to-be-processed data in a packet to be sent;
- setting a content label of the packet as indicating that the packet comprises the to-be- processed data; and
- sending the packet to the switch.

12. A switch, comprising:
- a processor; and
- a memory storing computer program instructions, wherein the processor runs the computer program instructions in the memory to control the switch to perform actions comprising:
- loading, in response to receipt of a model loading request from a terminal device, a data processing model specified in the model loading request;
- acquiring model parameters of the data processing model from the terminal device; and
- processing, in response to receipt of to-be-processed data from the terminal device, the data using the data processing model based on the model parameters;
- wherein the switch comprises a programmable switch and is implemented in a network separate from the terminal device;
- wherein the programmable switch is programmed to (i) select the data processing model based on the model parameters acquired from the terminal device, and (ii) process the data received from the terminal device using the selected data processing model;
- wherein the terminal device comprises an Internet of Things (IoT) device that provides both the model parameters and the to-be-processed data to the programmable switch, the model parameters and the to-be-processed data being provided by the IoT device to the programmable switch responsive to receipt of a service list in the IoT device from the programmable switch, the service list identifying a plurality of different neural network models that are executable in the programmable switch, the model parameters provided by the IoT device to the programmable switch comprising one or more characteristics of each of one or more network layers of a given one of the neural network models; and
- wherein an output generated by the programmable switch utilizing the selected data processing model is returned to the same IoT device that provided both the model parameters and the to-be-processed data to the programmable switch.

13. The switch according to claim 12, wherein loading the data processing model comprises:
- acquiring an identifier of the data processing model in the model loading request;

selecting, based on the identifier, the data processing model from a predetermined data processing model set; and loading the selected data processing model.

14. The switch according to claim 12, wherein acquiring the model parameters comprises:

determining, based on a content label of a packet received from the terminal device, whether the packet comprises model parameters related to the data processing model; and acquiring the model parameters from the packet according to a determination that the packet comprises the model parameters.

15. The switch according to claim 14, wherein the data processing model is a neural network model, and acquiring the model parameters from the packet comprises:

determining a parameter size corresponding to each processing layer of the neural network model; and acquiring model parameters corresponding to each processing layer from the packet according to the parameter size.

16. The switch according to claim 12, wherein the actions further comprise:

determining, based on a content label of a packet received from the terminal device, whether the packet comprises data to be processed by the data processing model; and determining, according to a determination that the packet comprises data to be processed by the data processing model, that the to-be-processed data is received.

17. The switch according to claim 12, wherein the data processing model is a neural network model, and processing the data comprises:

processing, based on model parameters corresponding to each processing layer of the neural network model, the data using the neural network model.

18. The switch according to claim 12, wherein the actions further comprise at least one of the following:

sending, in response to receipt of a destination address from the terminal device, a processing result for the data based on the destination address; and sending the processing result for the data to the terminal device.

19. A computer program product tangibly stored on a non-volatile computer-readable medium and comprising machine-executable instructions, wherein the machine-executable instructions, when executed, cause a machine to perform the steps of claim 1.

20. A computer program product tangibly stored on a non-volatile computer-readable medium and comprising machine-executable instructions, wherein the machine-executable instructions, when executed, cause a machine to perform the steps of claim 8.

* * * * *